US009287920B2

(12) United States Patent
Sturkovich et al.

(10) Patent No.: US 9,287,920 B2
(45) Date of Patent: Mar. 15, 2016

(54) DIPLEXER ELIMINATION IN MICROWAVE POINT-TO-POINT FDD SYSTEMS

(71) Applicant: Broadcom Corporation, Irvine, CA (US)

(72) Inventors: Yaacov Sturkovich, Netanya (IL); Igal Yahuda Kushnir, Azur (IL); Ronen Shaked, Kfar-Saba (IL)

(73) Assignee: Broadcom Corporation, Irvine, CA (US)

( * ) Notice: Subject to any disclaimer, the term of this patent is extended or adjusted under 35 U.S.C. 154(b) by 204 days.

(21) Appl. No.: 14/042,418

(22) Filed: Sep. 30, 2013

(65) Prior Publication Data

US 2015/0092622 A1  Apr. 2, 2015

Related U.S. Application Data

(60) Provisional application No. 61/843,232, filed on Jul. 5, 2013.

(51) Int. Cl.
*H04B 7/005* (2006.01)
*H04B 1/00* (2006.01)
*H04B 1/525* (2015.01)

(52) U.S. Cl.
CPC ..................................... *H04B 1/525* (2013.01)

(58) Field of Classification Search
USPC .................. 370/277–292; 375/355–356, 358, 375/371–376, 344–350, 296–297, 375/146–148; 455/17, 20–24, 63.1–63.3
See application file for complete search history.

(56) References Cited

U.S. PATENT DOCUMENTS

| | | | | |
|---|---|---|---|---|
| 5,657,358 | A * | 8/1997 | Panech et al. ................. | 375/356 |
| 6,334,219 | B1 * | 12/2001 | Hill et al. ....................... | 725/106 |
| 7,142,094 | B1 * | 11/2006 | Davidow et al. .............. | 370/401 |
| 7,646,807 | B1 * | 1/2010 | Manickam ........ | H04L 25/03057 |
| | | | | 375/232 |
| 2003/0203717 | A1 * | 10/2003 | Chuprun et al. ............. | 455/12.1 |
| 2004/0257157 | A1 * | 12/2004 | Sahlman ....................... | 330/149 |
| 2007/0155314 | A1 * | 7/2007 | Mohebbi ...................... | 455/11.1 |
| 2007/0280388 | A1 * | 12/2007 | Torre ....................... | H04B 3/23 |
| | | | | 375/350 |

* cited by examiner

*Primary Examiner* — Thai Hoang
(74) *Attorney, Agent, or Firm* — Sterne, Kessler, Goldstein & Fox P.L.L.C.

(57) ABSTRACT

A circulator based transceiver sharing a common antenna between a receive signal path and a transmit signal path is disclosed. Techniques to reduce coupled transmit signals and coupled transmit noise in a receive signal path, implemented in a variety of embodiments is disclosed allowing elimination of a diplexer, simplification of circulator design and reduction of transceiver cost. The transceiver includes means to generate and couple a correction signal into the receive signal path to attenuate coupled transmit signal in the receive path. Furthermore, the transceiver includes echo cancellation techniques to attenuate transmit noise in the receive signal path. Methods to utilize the transceiver to attenuate coupled transmit signal and transmit noise may improve transceiver efficiency, for example, in demodulation techniques and processing of data signal.

20 Claims, 4 Drawing Sheets

DIPLEXER ELIMINATION IN MICROWAVE POINT-TO-POINT FDD SYSTEMS

CROSS REFERENCE TO RELATED APPLICATION

This application claims the benefit of U.S. Provisional Application No. 61/843,232, filed Jul. 5, 2013, which is incorporated herein by reference in its entirety.

BACKGROUND

1. Field of the Disclosure

The disclosure generally relates to point-to-point transceivers, and more specifically to techniques to eliminate interference in point-to-point transceivers.

2. Related Art

Conventional microwave point-to-point transceivers, may typically utilize frequency domain duplexing (FDD) schemes with challenging isolation requirements between transmit and receive channels. Isolation requirements for transceivers exist to maximize receiver sensitivity to weak receive signals, from distant stations for example, or to maximize data throughput through a receive channel.

Spectrum management constraints may require transmit and receive channels to operate with minimal gap between one another. For example, when microwave transmit and receive channels are adjacent to one another, in some embodiments as close as 100 Mhz, the transmit signal and corresponding transmit noise may couple onto the receive antenna and the associated receive cabling and signal traces on PCBs, through various electromagnetic interference (EMI) paths, either radiated or conducted.

When the transmit signal itself, for example, couples into a sensitive receiver, the transmit signal, although adjacent to the receive channel, may saturate the receiver. In a similar way, corresponding transmit noise components, such as transmit signal harmonics, or intermodulation products, may directly overlap the receive channel, likewise saturating, or significantly reducing the sensitivity of the receiver to the intended receive signal. This effect is exacerbated, in some exemplary microwave point-to-point systems, where transmission signal power may exceed 30 dBm at a transmit antenna, while a corresponding receive channel may include signals that are received as low as −100 dBm at a receive antenna.

In other embodiments, the transmit and receive antennas may be collocated on a tower, or share a common antenna element, providing additional radiated and conducted paths for transmit signals and noise components to enter the receiver. Furthermore, in many cases, the degree or nature of transmit coupling into the receiver may be unpredictable at the time a microwave point-to-point system is designed. Coupling mitigation techniques as discussed above, that may not detect and adapt to changing or initially unpredictable conditions, such as temperature variations, atmospheric changes, or corrosion of transmit and receive antenna elements or feed lines, may not be sufficient to meet system requirements either at initial installation, or over the operational life of the system.

To minimize this unintended coupling, in many cases, RF circuit paths in receivers may include shielding assemblies to isolate receive PCB signal traces and cabling from radiated transmit signals or transmit noise coupling onto the signal traces. Likewise, PCB signal traces and cabling feeding sensitive receivers typically may include common-mode filters or physical isolation to prevent transmit signals and corresponding noise components from coupling into a sensitive receiver. These isolation techniques however may not reduce transmit coupling enough to meet the isolation requirements necessary for proper operation of the receiver, for example, to receive distant transmit station signals, or operate high bandwidth waveforms, particularly sensitive to noise in the receive channel. Thus, in some embodiments, in order to meet stringent isolation requirements between transmit and receive channels, microwave point-to-point systems may include specifically designed diplexers to share a common antenna between a receiver and transmitter.

Such diplexers may typically include, for example, a low pass filter coupled to a receive path, and a high pass filter coupled to a transmit path, both coupled to a common antenna. The low and high pass filters may provide isolation between the respective receive and transmit channels by designing the cutoff frequency of the respective filters in a way that attenuates interfering signals coupled from the opposite signal path. In many cases, the diplexer provides the required isolation between receive and transmit paths, however at a significant cost in component cost, size, and configurability.

Diplexers may be physically large due to the number and size of the inductors and capacitors necessary to provide the isolation and steep cutoff required by closely adjacent channels. Due to their large size, diplexers may be unable to take advantage of current surface mount packaging and installation techniques, instead requiring manual installation and tuning. Furthermore, point-to-point systems microwave systems may be unable to configure diplexers once they are installed due to the nature of their manufacture and isolation structures contained therein. Thus, diplexers may drive significant cost and design constraints on microwave point-to-point systems, and other communications systems.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Figure 1:
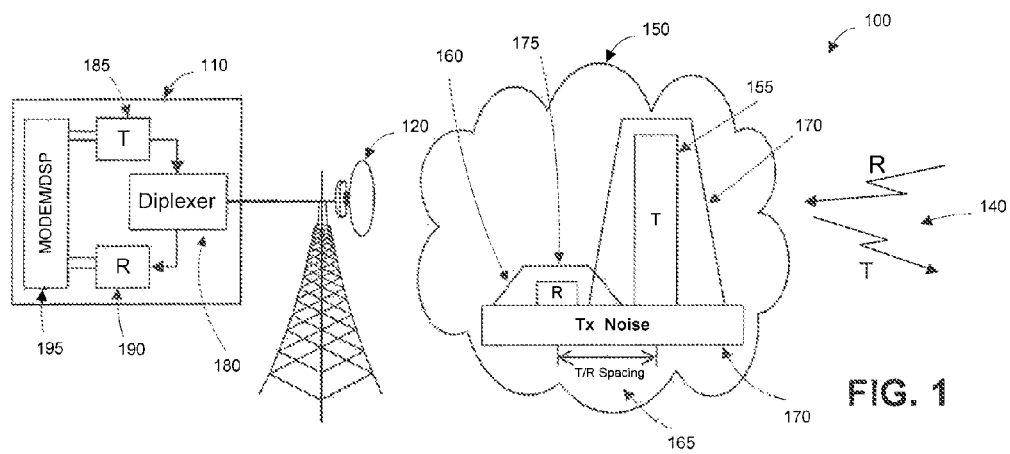
FIG. 1 illustrates a block diagram of a microwave point-to-point FDD system according to an exemplary embodiment of the present disclosure.

Embodiments of the disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

An Exemplary Diplexer Based Transceiver

FIG. 1 illustrates a microwave point-to-point FDD system 100 including a diplexer based transceiver 110 coupled to a shared antenna 120. The point-to-point system 100 may communicate data, voice, or other communication signals to and from other point-to-point, or point-to-multipoint, systems (not shown in FIG. 1) via radiated RF signals 140. The radiated RF signals 140 can be, for example, in the microwave band and having pre-allocated or dynamically assigned receive and transmit frequency channels. The common antenna 120 may, in some embodiments, include multiple antenna elements, each corresponding to different frequency channel(s), such as receive channels and transmit channels. In other embodiments, for example, the antenna may share a common element that is shared among the receive and transmit frequency channels. The antenna 120 may carry an FDD transmit and receive signal pair 150.

The FDD signal pair 150 may include a transmit signal 155, and a receive signal 160, separated, for example, by a transmit/receive channel spacing 165 that in some embodiments may be as little as 100 MHz. In some embodiments, the magnitude of the transmit signal 155 is many orders of magnitude larger than the magnitude of the receive signal 160. The transmit signal 155 may be associated with transmit noise components 170 as a result of intermodulation or harmonics that roll off in magnitude with frequencies above and below the transmit center frequency. Transmit harmonics may comprise signal peaks at integer multiple frequencies of the transmit center frequency in a predictable manner. Other embodiments of transmit noise components 170 may be unpredictable or vary in a unpredictable way. As illustrated in FIG. 1, the transmit noise 170 may encroach near or within the receive signal 160. The receive signal 160 may also be associated receive noise components 175, as a result of, for example, multipath or atmospheric interference.

The transceiver 110, includes a diplexer 180 that couples both transmitter 185 and receiver 190 circuitry in the transceiver 110 to the antenna 120. In one embodiment, a modulator/demodulator (MODEM) or digital signal processor (DSP) 195 couples to the transmitter 185 and receiver 190 circuitry to both generate and modulate the transmit signal 155, and/or process and demodulate the receive signal 160. The presence of the relatively strong transmit signal 155 in close frequency proximity with the receive signal 160, in combination with encroaching transmit noise 170, may significantly degrade the sensitivity and performance of the receive circuitry 190 and the demodulation and processing in the MODEM/DSP 195. Thus, the diplexer may include filtering elements (not shown in FIG. 1) to attenuate the transmit signal 155 and transmit noise 170 before it enters the receive circuitry 190 and the MODEM/DSP 195.

Figure 2:
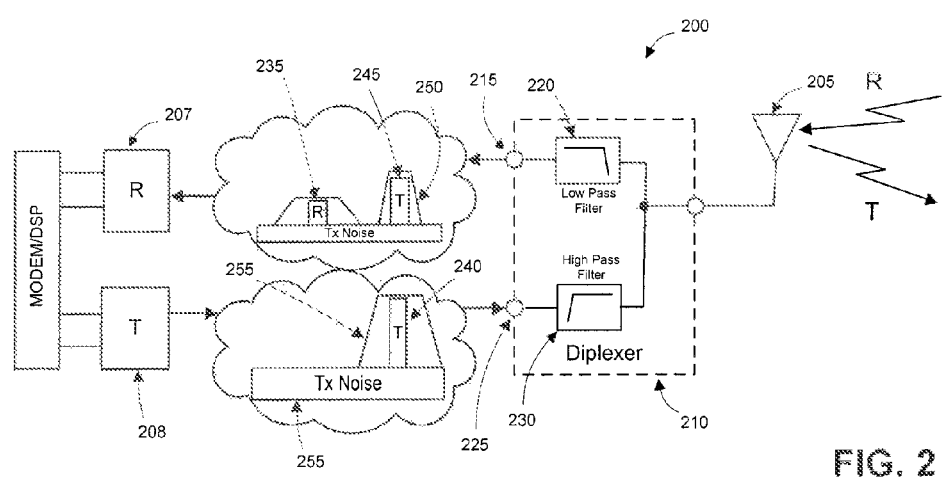
FIG. 2 illustrates a block diagram of a diplexer based transceiver sharing a common antenna according to an exemplary embodiment of the present disclosure.

FIG. 2 illustrates a transceiver 200 that is one embodiment of transceiver 110. Transceiver 200 includes receive circuitry 207 and transmit circuitry 208 that share a common antenna 205, and coupled to the antenna 205 via a diplexer 210. The diplexer 210 includes an interface to a shared antenna 205, a receive signal path 215 including a low pass filter 220, and a transmit signal path 225 including a high pass filter 230. The low pass filter 220 has a respective cutoff frequency higher than a frequency of a receive signal 235, but lower than a frequency of a transmit signal 240, and thereby passes the receive signal 235 while attenuating a coupled transmit signal 245 and coupled transmit noise 250. The low pass filter 220 may provide a steeper cutoff as the frequency of the transmit signal 240, approach the frequency of the receive signal 235.

In a similar way, the low pass filter 220 may provide more significant attenuation as the magnitude of the transmit signal 240 increases, or the magnitude of the receive signal 235 decreases. Typically, the low pass filter 220 becomes more complex and costly to achieve higher attention and a sharper frequency cutoff, which becomes necessary as the frequency spacing between the receive signal 235 and transmit signal 240 narrows.

Coupled transmit signal noise 250 in the receive path 215 originates as transmit noise 255 in the transmit path 225. Therefore, the transmit path 225 includes a high pass filter 230 to attenuate transmit noise 255 in order to further attenuate coupled transmit noise 250 in the vicinity of the receive signal 235 in the receive signal path 215. The cutoff frequency of the high pass filter 230 may lie directly adjacent to the lower end of the transmit signal 240, provide a steep cutoff, and significantly attenuate the transmit noise 255 below the cutoff frequency. However, as discussed with regard to the low pass filter 220, steep cutoffs and significant filter attenuation require higher cost and complexity for the filter design. Therefore, the diplexer cost can increase substantially as the frequency gap between the receive and transmit channel narrows, and/or as the magnitude difference between the receive signal 235 and transmit signal 240 increases. Furthermore, even with significant filtering, the receive signal path 215 and transmit signal path 225 may require physical isolation, which drives additional cost, complexity, and limits configurability transceiver 200.

An Exemplary Circulator Based Transceiver

Figure 3:
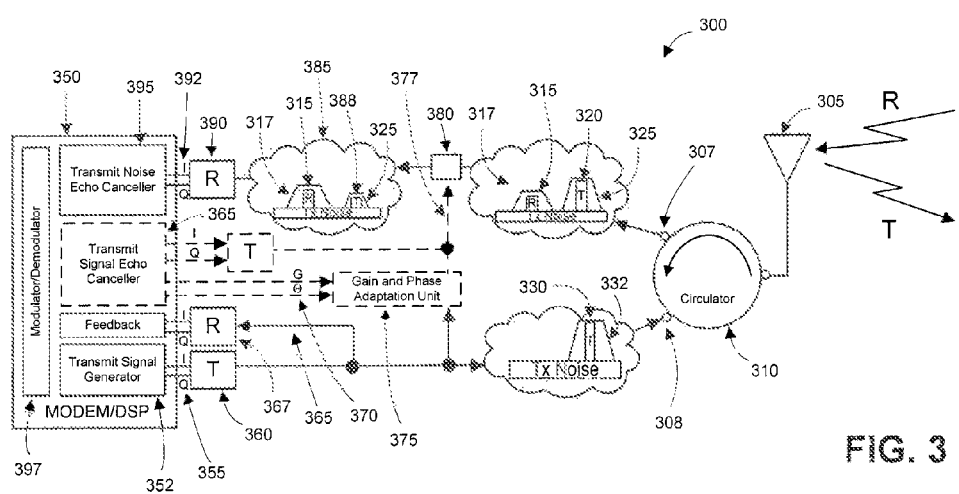
FIG. 3 illustrates a block diagram of a circulator based transceiver sharing a common antenna according to an exemplary embodiment of the present disclosure.

FIG. 3 illustrates a circulator based transceiver 300 having a receive signal path 307 and a transmit signal path 308 that shares a common antenna 305, and coupled to the antenna 305 via a circulator 310. The circulator 310 may lack the necessary isolation between the receive signal path 307 and transmit signal path 308. Therefore, the transceiver 300 may include a means to attenuate any coupled transmit signal in the receive signal path 307 by generating a correction signal and coupling the correction signal also into the receive signal path 307. Furthermore, the transceiver 300 may include a transmit noise echo canceller to attenuate coupled transmit noise from the receive signal path 307.

As illustrated in FIG. 3, the receive signal path 307 includes the receive signal 315, receive noise 317, as well as a coupled transmit signal 320 and coupled transmit noise 325. The coupled transmit signal 320 and coupled transmit noise 325 may correspond to the frequency of the transmit signal 330 and transmit noise 332 from the transmit signal path 308. Coupling mechanisms, such as radiated or conducted paths through, for example, the antenna 305 or circulator 310 may result in varying magnitudes of coupled transmit signal 320 and coupled transmit noise 325 coupling into the receive signal path 307. The coupled transmit noise 325 may appear, for example, within or adjacent to the receive signal 315. Likewise, depending on the frequency spacing between the transmit signal 330 and receive signals 315, the coupled transmit signal 320 and respective noise 325 may have sufficient magnitude to reduce the receive performance or sensitivity of the downstream receive circuitry 350, or the MODEM/DSP 397.

The MODEM/DSP 397 may generate, for example, in the transmit signal generator 352, in-phase (I) and quadrature (Q) transmit signal components 355 of the transmit signal 330. Subsequently, an upconverter 360 frequency up-converts the I and Q transmit signal components 355 to provide the transmit signal 330 having I Q information from the I Q signal components 355. The MODEM/DSP 350 may also use the I and Q transmit signal components 355 in a transmit signal echo canceller 365, together with a sampled transmit signal path 365, downconverted in a downconverter 367, to generate gain (G) and phase (theta) parameters 370. The G and Theta parameters 370 may, in some embodiments, configure a gain and phase adaptation unit 375 to adapt the transmit signal 330 to generate a correction signal 377. The correction signal 377 may include a phase angle 180 degrees out of phase with the coupled transmit signal 320 and a magnitude corresponding to the magnitude of the coupled transmit signal 320. In another embodiment, the transmit signal echo canceller 365 may generate in-phase (I) and quadrature (Q) components of the correction signal 377 directly.

A coupler 380 may combine the receive signal path 307 with the correction signal 377 to attenuate the coupled transmit signal 320 in the receive signal path 307, resulting in a corrected receive path 385 with an attenuated coupled transmit signal 388. A receive signal downconverter 390 may downconvert the signals on the corrected receive path 385, including the attenuated coupled transmit signal 388, the coupled transmit noise 325, and the receive signal 315, and provide the I and Q components 392 to the transmit noise echo canceller 395. The transmit noise echo canceller 395 subsequently may utilize a plurality of echo cancellation techniques to identify and attenuate noise components found within the coupled transmit noise 325, including the downconverted sampled transmit signal path 365. As such, the combination of attenuating the coupled transmit signal 320 using the correction signal 377, and echo cancellation of the coupled transmit noise 325 improves the signal sensitivity during demodulation performed by the modulator/demodulator 397.

Figure 4:
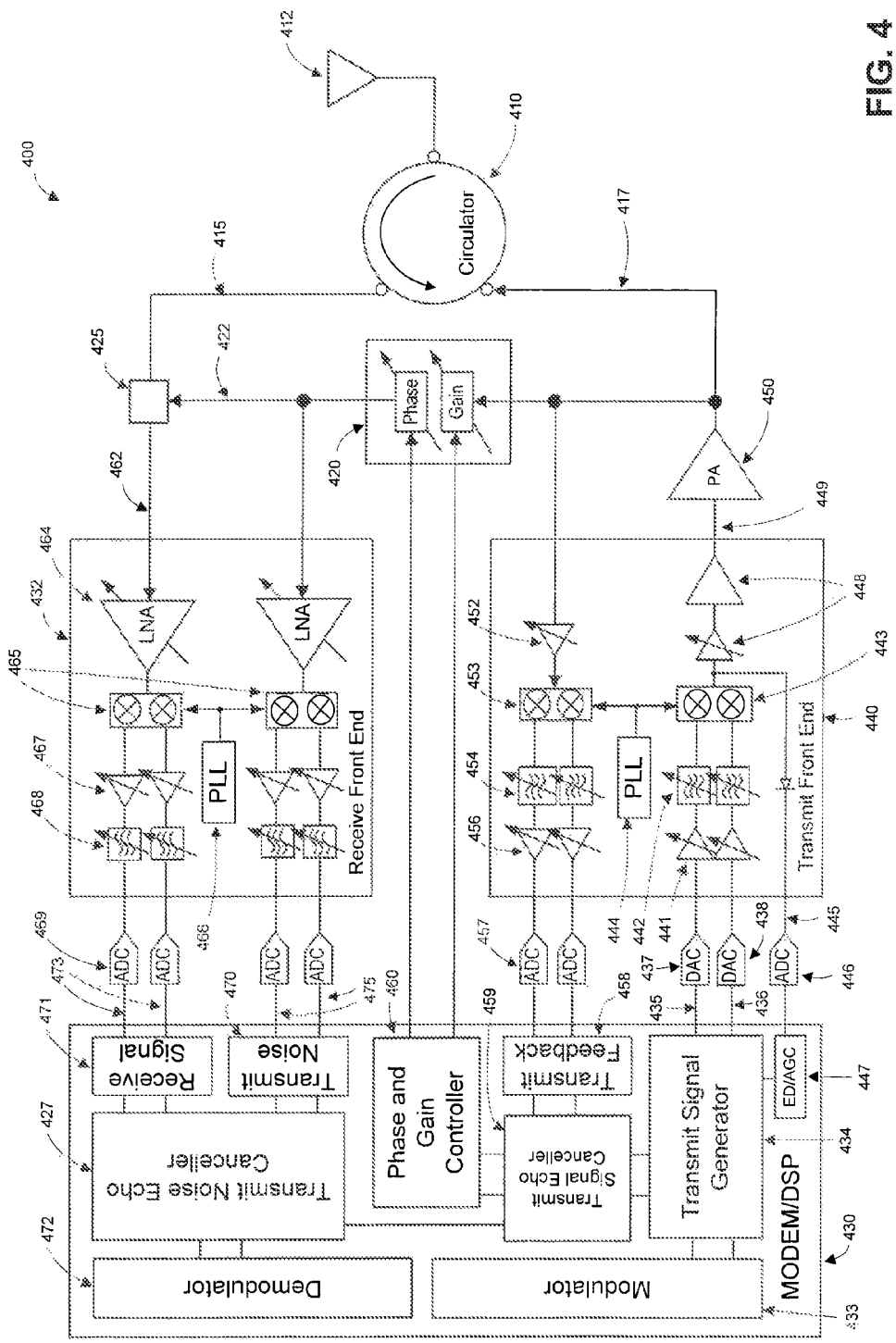
FIG. 4 illustrates a block diagram of a circulator based transceiver comprising a phase and gain compensator according to an exemplary embodiment of the present disclosure.

FIG. 4 illustrates a circulator based transceiver 400 according to embodiments of the disclosure comprising a circulator 410 that couples an antenna 412 to a receive signal path 415, while coupling a transmit signal path 417 to the antenna 412. However, in embodiments that lack filtering in the circulator 425, for example as illustrated in FIG. 3, the transmit signal and transmit noise carried on the transmit signal path 417 may couple into the receive signal path 415. Thus, a phase and gain compensator 420 may adapt the transmit signal carried on the transmit signal path 417 to generate a correction signal 422. The correction signal 422 when combined in a coupler 425 with the receive signal carried on the receive signal path 415, may attenuate the coupled transmit signal in the receive signal path 415. A transmit noise echo canceller 427 in a MODEM/DSP 430 may subsequently and/or separately attenuate the remaining coupled transmit noise following downconversion, for example, in a receive front-end 432.

The exemplary MODEM/DSP 430 illustrated in FIG. 4 may include a modulator 433 that modulates data onto a carrier signal. In some embodiments, the modulator 433 may perform digital modulation to modulate digital data into a digital signal, for example, comprising in-phase and quadrature components. A corresponding transmit signal generator 434 may receive a modulated signal, in some embodiments in a digital format, and generate, for example, a modulated baseband signal. The modulated baseband signal may include, for example, in-phase 435 and quadrature 436 components provided to corresponding in-phase 437 and quadrature 438 digital-to-analog converters (DACs).

The in-phase 437 and quadrature 438 DACs convert a digital signal to an analog signal. As illustrated in FIG. 4, the in-phase 437 and quadrature 438 DACs may lie outside the MODEM/DSP 430 as separate components. In other embodiments, a transmit front-end component 440 may include the in-phase 437 and quadrature 438 DACs within a single packaged component. The transmit front-end component 440 may include tunable amplifiers 441, and tunable filters 442 for each in-phase and quadrature signal component prior to upconversion with mixers 443 and a clock signal provided, for example, by a phase lock loop (PLL) 444 or some other local oscillator. The MODEM/DSP 430, may in some embodiments, control the tunable amplifiers 441 and tunable filters 442, for example, with a digital control signal generated by the modulator 433 or transmit signal generator 434.

The transmit front-end component 440 may include an envelope detection and automatic gain control (ED/AGC) feedback path 445 including an analog to digital converter 446 and an ED/AGC controller 447 in the MODEM/DSP 430. The ED/AGC controller 447 may generate and transmit control signals to the transmit signal generator 434 to automatically control the signal level in the MODEM/DSP 430. Additional tunable and fixed gain amplifiers within the transmit front-end component 440 may amplify the upconverted transmit signal 449. In some embodiments, a power amplifier 450, external to the transmit front-end component 440, may amplify the upconverted transmit signal 449 and transmit the upconverted transmit signal 449 onto the transmit signal path 417. During amplification, the power amplifier 450 may introduce additional transmit noise into the transmit signal path 417. Such generated transmit noise may include intermodulation and harmonic noise components.

The transmit front-end component 440 may, in some embodiments, include a feedback downconverter in the transmit front-end component 440 to downconvert the transmit signal carried on the transmit signal path 417 back to a digital baseband format for analysis by the MODEM/DSP 430. The feedback downconverter may, in some embodiments, include at least one tunable low-noise amplifier (LNA) 452, and a mixer 453 that downconverts the transmit signal using a clock signal generated from the PLL 444, which is the same clock signal used for upconversion by the mixers 443.

Tunable filters 454 may filter the in-phase and quadrature signal components of the downconverted transmit signal. Likewise, tunable amplifiers 456 amplify the downconverted transmit signal. The MODEM/DSP 430 may, in some embodiments, independently control the tunable filters 454 and tunable amplifiers 456 to select particular signal components of interest. Analog to digital converters 457, in some embodiments external to the transmit front-end component 440, subsequently convert the analog in-phase and quadrature components of the downconverted transmit signal to a digital format that is received by a transmit feedback controller 458 within the MODEM/DSP 430. As such, the transmit feedback controller 458 may receive a digital representation of the transmit signal carried on the transmit signal path 417 at a signal input of the circulator 410, where the digital representation of the transmit signal includes any transmit noise, including any harmonics or other noise introduced by the power amplifier 450. Thus, a transmit signal echo canceller 459 in the MODEM/DSP 430 may, in some embodiments, perform an echo cancellation procedure on the digital representation of the transmit signal carried on the transmit signal path 417 and identify both the transmit signal and the predicted corresponding coupled transmit signal in the receive signal path 415. In other words, the transmit signal echo canceller 459 predicts the coupled transmit signal in the receive path 415 by detecting the transmit signal at the input of circulator 410.

The transmit signal echo canceller 459 may provide data identifying the transmit signal and the predicted corresponding coupled transmit signal in the receive signal path 415 to a phase and gain controller 460. The phase and gain controller 460 may calculate phase and gain parameters that correspond to the magnitude and phase angle of the identified transmit signal and the predicted corresponding coupled transmit signal in the receive signal path 415. By configuring the phase and gain adaptation unit 420 with the phase and gain parameters calculated by the phase and gain controller 460, the phase and gain adaptation unit 420 may generate the correction signal 422. The phase and gain adaption unit 420 is coupled to the output of the power amplifier 450 and therefore receives a portion of the transmit signal on the transmit path 417. The phase and gain adaption unit 420 may phase shift the transmit signal on the transmit signal path 417 according to the phase parameter and amplify or attenuate the transmit signal on the transmit signal path 417 according to the gain parameter to form the correction signal 422, such that the correction signal 422 is later used to cancel at least a portion of the coupled transmit signal in the receive path.

A coupler 425 may combine the receive signal carried on the receive signal path 415 with the correction signal 422 to attenuate the transmit signal coupled into the receive signal path 415 resulting in a corrected receive signal 462. In some embodiments the corrected receive signal 462 and the correction signal 422 may include coupled transmit noise. Thus, a receive front-end component 432 may downconvert the correction signal 422 and the MODEM/DSP 430 may identify and cancel transmit noise components that may exist within the corrected receive signal 462, for example, with the transmit noise echo canceller 427. The receive front-end component 432, may include multiple downconverters, for example, one to downconvert the correction signal 422, and one to downconvert the corrected receive signal 462.

Each downconverter may, similar to the downconverter in the transmit front-end 440, include independently tunable LNAs 464, downconversion mixers 465 using a common clock generated by a PLL 466, in-phase and quadrature tunable amplifiers 467, and in-phase and quadrature tunable filters 468. The MODEM/DSP 430 may, in some embodiments, independently control each tunable component within the receive front-end component 432, for example, to isolate or emphasize particular signal characteristics of the receive signal or coupled transmit noise. In some embodiments, the receive front-end component 432 and the transmit front-end components 440 may include similar or identical components, packaging, and/or functionality.

Analog to digital converters 469, in some embodiments external to the receive front-end component 432, convert the downconverted or baseband in-phase and quadrature components of the corrected receive signal 462 and correction signal 422 to respective digital formats 473 and 475. A transmit noise controller 470 may receive the digital downconverted correction signal 475 from the corresponding ADCs 469, identify coupled transmit noise components such as intermodulation products and signal harmonics, and provide data identifying such components to the transmit noise echo canceller 427. A receive signal controller 471 may similarly receive the digital downconverted corrected receive signal 473 from the corresponding ADCs 469, identify the receive signal, and provide data identifying the receive signal to the transmit noise echo canceller 427. In some embodiments, the transmit noise echo canceller 427 may cancel the identified coupled transmit noise components from the digital downconverted corrected receive signal 475 and provide the receive signal, with attenuated coupled transmit signal and coupled transmit noise to a demodulator 472 for demodulation and subsequent processing. As such, the demodulator 472, with attenuated coupled transmit signal and coupled transmit noise, is able to demodulate the receive signal with enhanced signal sensitivity.

Figure 5:
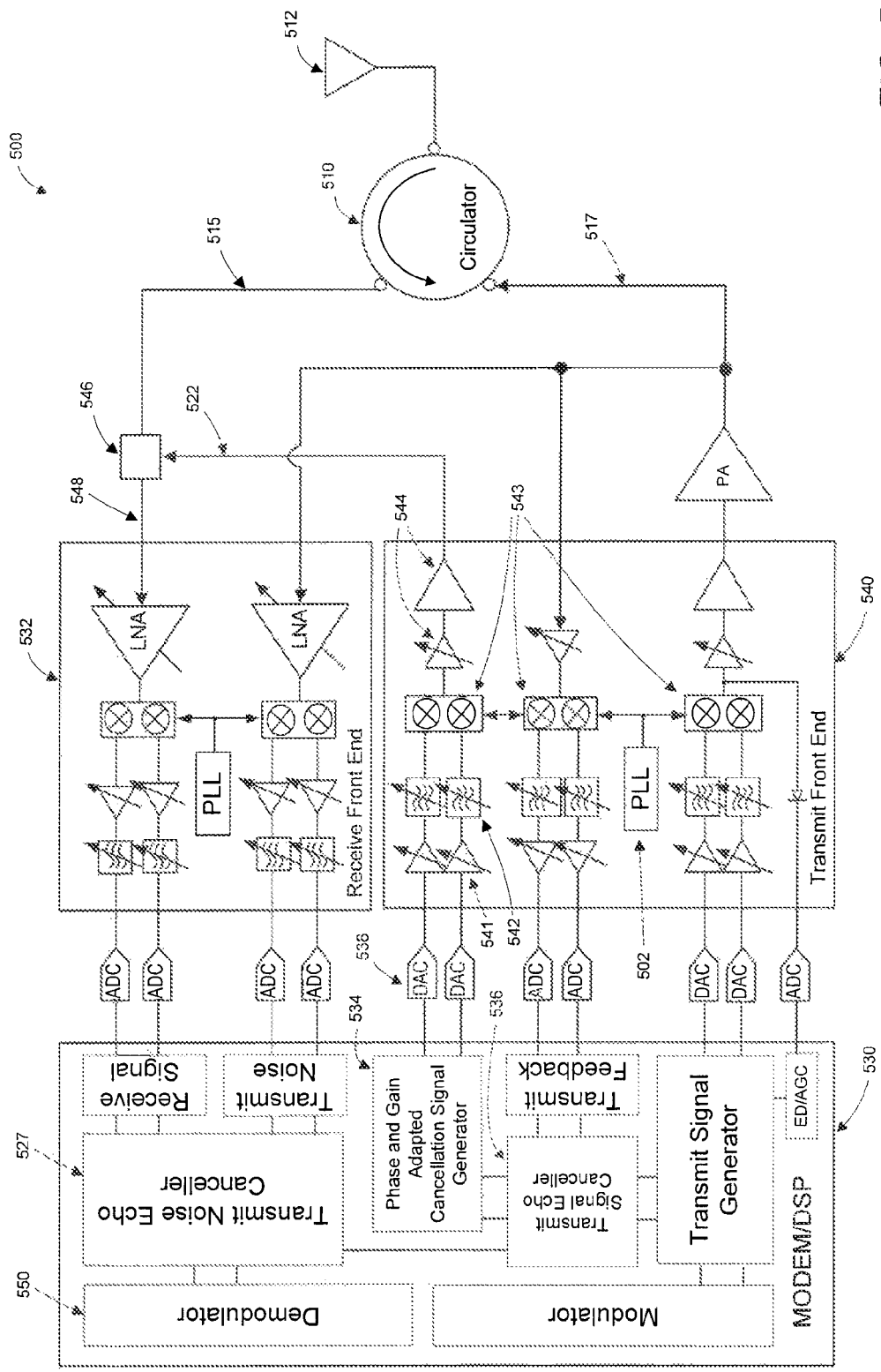
FIG. 5 illustrates a block diagram of a circulator based transceiver comprising a correction signal generator according to an exemplary embodiment of the present disclosure.

FIG. 5 illustrates a circulator based transceiver 500 comprising a circulator 510 that couples an antenna 512 to a receive signal path 515, while coupling a transmit signal path 517 to the antenna 512. Similar to the embodiment illustrated in FIG. 4, the transmit signal and transmit noise carried on the transmit signal path 517 may couple into the receive signal path 515. However, the embodiment illustrated in FIG. 5 may generate a correction signal 522 directly instead of including a phase and gain compensator to generate a correction signal. The correction signal 522, in some embodiments, is combined in a coupler 546 with the receive signal carried on receive signal path 515, and may attenuate the coupled transmit signal in the receive signal path 515, similar to the embodiment illustrated in FIG. 4. Further, a transmit noise echo canceller 527, for example in a MODEM/DSP 530, may subsequently attenuate the remaining coupled transmit noise following downconversion, for example, in a receive front-end 532.

The embodiment illustrated in FIG. 5 includes a phase and gain adapted cancellation signal generator 534, for example, within the MODEM/DSP 530 that receives predicted coupled transmit signal identifiers from the transmit signal echo canceller 536. Subsequently, the cancellation signal generator 534 may generate digital representations of in-phase and quadrature signal components of a cancellation signal based on the transmit signal identifiers.

Digital to analog converters 538 may convert the digital representations of in-phase and quadrature signal components of the cancellation signal 522 into analog equivalents. After which, an upconverter in a transmit front-end component 540 upconverts the in-phase and quadrature components to form the correction signal 522. The cancellation upconverter in the transmit front-end component 540 may include similar components as the transmit signal upconverter in FIG. 4. For example, the cancellation upconverter may include tunable baseband in-phase and quadrature amplifiers 541, filters 542, and mixers 543 that share a common clock signal with a PLL 502 used by the transmit upconverter. A coupler 546 combines the receive signal on the receive signal path 515 with the upconverted correction signal 522, resulting in a corrected receive signal 548, for example, in a similar way as illustrated in FIG. 4.

By generating the correction signal 522 directly, the embodiment illustrated in FIG. 5 allows additional physical isolation between the transmit signal path 517 and receive signal path 515 by omitting the phase and gain adaption unit illustrated in FIG. 4, thus eliminating some coupling paths for transmit signal and transmit signal noise to enter the receive signal path 515. The receive front-end component 532 may downconvert the transmit noise carried on the transmit signal path 517 directly to enable the transmit noise echo canceller 527 to analyze the transmit noise carried on the transmit signal path 517. As such, the demodulator 550, with attenuated coupled transmit signal and attenuated coupled transmit noise, may operate more efficiently on the receive signal while physically separating the transmit signal path 517 and the receive signal path 515, and eliminating the gain and phase adaptation unit illustrated in FIG. 4.

Figure 6:
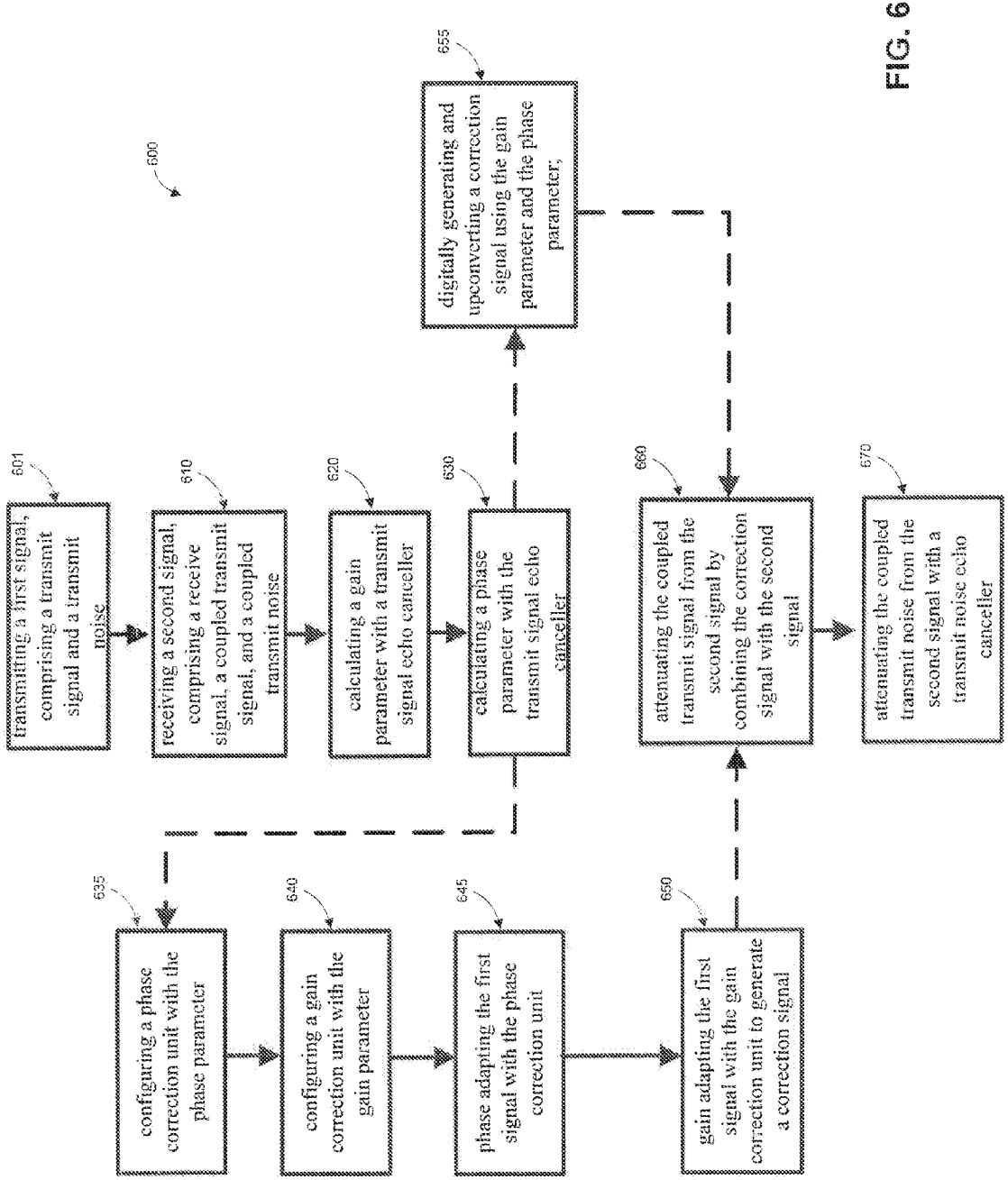
FIG. 6 is a flowchart of operational steps to reduce interference from a received signal, according to an exemplary embodiment of the present disclosure.

FIG. 6 illustrates a block diagram flowchart 600 that includes exemplary method steps to attenuate coupled transmit signal and coupled transmit noise. The flowchart illustrated in FIG. 6 references the exemplary embodiments illustrated in FIGS. 1-5, however, the exemplary embodiments illustrated in FIGS. 1-5 do not limit the exemplary method steps illustrated in flowchart 600. As such, the order of method steps illustrated in flowchart 600, in some embodiments, may execute in alternative orders, or in other embodiments, execute simultaneously while remaining within the scope and spirit of the disclosure.

The flowchart 600 includes step 601 wherein, in some embodiments, a transmitter, or a transmit front-end component including a power amplifier, may transmit a first signal. The first signal may, for example, include a transmit signal and a transmit noise. In some embodiments, the transmit noise may include multiple components, for example, but not limited to, intermodulation products and/or signal harmonics. At step 610, in some embodiments, a receiver or a receive front-end component, may receive a second signal. The second signal may include a receive signal, a coupled transmit signal in some embodiments corresponding to the transmit signal in step 601, and a coupled transmit noise in some embodiments corresponding to the transmit noise in step 601. In some embodiments, steps 601 and 610 may include transmitting or receiving using a circulator or diplexer coupled to an antenna.

Step 620 includes calculating a gain parameter with a transmit signal echo canceller, in some embodiments, utilizing calibration and transmit feedback data to predict the magnitude of a coupled transmit signal in the receive signal path. Likewise, step 630 includes calculating a phase parameter with a transmit signal echo canceller, in some embodiments, utilizing calibration and transmit feedback data to predict the phase angle of a coupled transmit signal in the receive signal path. The phase parameter in step 630 may, in some embodiments, correspond to a phase angle difference between a feedback transmit signal and a predicted coupled transmit signal. Likewise, the gain parameter in step 620 may, in some embodiments, correspond to a magnitude difference between a feedback transmit signal and a predicted coupled transmit signal.

One embodiment of the flowchart 600 includes step 635-650 wherein, for example, a MODEM/DSP may configure phase correction and gain correction units with the phase and gain parameters, and subsequently phase and gain adapt the first signal with the configured phase and gain correction units to generate a correction signal. Step 635, for example, includes configuring a phase correction unit with the phase parameter. In one embodiment, a MODEM/DSP may configure the phase correction unit with the phase parameter digitally over a data bus. In another embodiment, the phase correction unit may receive the phase parameter in an analog manner, for example, indicating a phase angle with a frequency reference. Step 640, may include configuring a gain correction unit with the gain parameter. In one embodiment, a MODEM/DSP may configure the gain correction unit with the gain parameter digitally over a data bus.

The gain correction unit may receive the gain parameter in an analog manner, for example, indicating a gain with an analog voltage or current level. Step 645 includes, for example, phase adapting the first signal with the phase correction unit. In some embodiments, the phase correction unit phase adapts the first signal utilizing the phase parameter, however, in other embodiments the phase correction unit phase adapts the first signal utilizing an automated phase detection scheme, or an adaptive phase control method controlled, for example, by a MODEM/DSP. Likewise, step 650 includes, for example, gain adapting the first signal with the gain correction unit to generate a correction signal. In some embodiments, the gain correction unit gain adapts the first signal utilizing the gain parameter to generate a correction signal.

Step 660 includes attenuating the coupled transmit signal from the second signal, in some embodiments a receive signal path, by combining the correction signal with the second signal. The correction signal may include the correction signal generated in step 650. Step 670, in some embodiments, includes attenuating the coupled transmit noise from the second signal, in some embodiments a receive signal path, with a transmit noise echo canceller. The transmit noise echo canceller included in step 670 may, in some embodiments, identify a plurality of coupled noise components in the second signal, and attenuate at least one of the identified coupled noise components utilizing echo cancellation techniques. As such, the method steps illustrated in the flowchart 600, may attenuate the coupled transmit signal and coupled transmit noise in a second signal.

Another embodiment of the flowchart 600 includes step 655 instead of steps 635-650. In step 655, a MODEM/DSP may digitally generate and upconvert a correction signal using the phase and gain parameters. The embodiments illustrated in steps 635-650 and step 655, may, in a plurality of embodiments, execute simultaneously, in the alternative, in cooperation, or in differing orders than illustrated in the flowchart 600 without limiting other embodiments and while remaining within the scope and spirit of the disclosure.

Step 655 includes digitally generating and upconverting a correction signal using the gain and phase parameters, in some embodiments with a MODEM/DSP and a transmit front-end component. The correction signal generated in steps 650 and 655, may in some embodiments, contain similar characteristics, or in other embodiments, work in synergy with one another.

Step 660 includes attenuating the coupled transmit signal from the second signal, in some embodiments a receive signal path, by combining the upconverted correction signal with the second signal. The correction signal may include the correction signal generated in step 650, step 655, or a combination thereof. Step 670, in some embodiments, includes attenuating the coupled transmit noise from the second signal, in some embodiments a receive signal path, with a transmit noise echo canceller. The transmit noise echo canceller included in step 670 may, in some embodiments, identify a plurality of coupled noise components in the second signal, and attenuate at least one of the identified noise components utilizing echo cancellation techniques. As such, the method steps illustrated in the flowchart 600, including the embodiment including step 655, may attenuate the coupled transmit signal and coupled transmit noise in a second signal.

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the appended claims in any way.

CONCLUSION

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. A method to reduce interference in a communication system, the method comprising:
    transmitting a first signal comprising a transmit signal and a transmit noise;
    receiving a second signal comprising a receive signal, a coupled transmit signal, and a coupled transmit noise;
    calculating a gain parameter with a transmit signal echo canceller based on the first signal;
    calculating a phase parameter with the transmit signal echo canceller based on the first signal;
    generating a correction signal using the gain parameter and the phase parameter;
    attenuating the coupled transmit signal from the second signal by combining the correction signal with the second signal; and
    attenuating the coupled transmit noise from the second signal with a transmit noise echo canceller.

2. The method of claim 1, wherein generating the correction signal comprises:
    configuring a gain correction unit with the gain parameter;
    configuring a phase correction unit with the phase parameter;
    phase adapting the first signal with the phase correction unit; and
    gain adapting the first signal with the gain correction unit.

3. The method of claim 1, wherein generating the correction signal comprises:
    generating an in-phase component and a quadrature component of the correction signal with the gain parameter and the phase parameter; and
    upconverting the correction signal with the in-phase and quadrature components of the correction signal.

4. The method of claim 1, wherein calculating the gain parameter comprises:
    identifying a frequency of the transmit signal;
    measuring a magnitude of the transmit signal at the frequency of the transmit signal;
    determining a magnitude of the coupled transmit signal in the second signal from the magnitude of the transmit signal and a gain calibration parameter; and
    determining the gain parameter that corresponds to the magnitude of the coupled transmit signal in the second signal at the frequency of the transmit signal.

5. The method of claim 1, wherein calculating the phase parameter comprises:
    identifying a frequency of the transmit signal;
    measuring a phase angle of the transmit signal at the frequency of the transmit signal;
    determining an anti-phase of the coupled transmit signal in the second signal from the phase angle of the transmit signal and a phase calibration parameter: and
    determining the phase parameter that corresponds to a phase angle difference between the anti-phase of the coupled transmit signal and the phase angle of the transmit signal.

6. The method of claim 1, wherein attenuating the coupled transmit noise comprises:
    identifying a noise component of the transmit noise; and
    attenuating a noise component of the coupled transmit noise corresponding to the noise component of the transmit noise.

7. The method of claim 4, further comprising;
    measuring the magnitude of the coupled transmit signal in the second signal after downconversion;
    measuring the magnitude of the transmit signal in the first signal after downconversion; and
    determining the gain parameter by calculating a magnitude difference between the magnitude of the transmit signal and the magnitude of the coupled transmit signal.

8. The method of claim 5, further comprising:
    measuring a phase angle of the coupled transmit signal in the second signal after downconversion;

measuring the phase angle of the transmit signal in the first signal after downconversion; and determining the phase calibration parameter by calculating a phase angle difference between the phase angle of the transmit signal and the phase angle of the coupled transmit signal.

9. The method of claim 1, further comprising transmitting the first signal and receiving the second signal through a circulator coupled to an antenna.

10. The method of claim 1, further comprising transmitting the first signal and receiving the second signal through a diplexer coupled to an antenna.

11. An apparatus to reduce interference, comprising:
a transmit upconverter configured to upconvert a first signal comprising a transmit signal and a transmit noise;
a power amplifier, coupled to the transmit upconverter, configured to amplify the first signal;
a receive input configured to receive a second signal comprising a receive signal, a coupled transmit signal coupled from the transmit signal, and a coupled transmit noise coupled from the transmit noise;
a transmit feedback downconverter, coupled to the power amplifier, configured to downconvert the transmit signal:
a gain correction unit, coupled to the power amplifier, configured to modify a magnitude of the transmit signal with a gain parameter;
a phase correction unit, coupled to the gain correction unit, configured to modify a phase angle of the transmit signal with a phase parameter to generate a correction signal;
a transmit signal echo canceller, coupled to the transmit feedback downconverter, the gain correction unit, and the phase correction unit, configured to calculate the gain and phase parameters and configure the gain and phase correction units;
a transmit noise downconverter configured to downconvert the transmit noise;
a signal coupler, coupled to the phase correction unit and the receive input, configured to attenuate the coupled transmit signal in the second signal by combining the correction signal with the second signal;
a receive signal downconverter, coupled to the signal coupler, configured to downconvert the second signal; and
a transmit noise echo canceller, coupled to the receive signal downconverter and the transmit noise downconverter, configured to attenuate the coupled transmit noise in the second signal.

12. The apparatus of claim 11, wherein the transmit noise echo canceller is configured to:
identify a noise component of the transmit noise; and
attenuate a noise component of the coupled transmit noise corresponding to the noise component of the transmit noise.

13. The apparatus of claim 11, wherein the transmit signal echo canceller is configured to:
identify a frequency of the transmit signal;
measure the magnitude of the transmit signal at the frequency of the transmit signal;
determine a magnitude of the coupled transmit signal in the second signal from the magnitude of the transmit signal and a gain calibration parameter;
determine the gain parameter that corresponds to the magnitude of the coupled transmit signal in the second signal at the frequency of the transmit signal;
measure the phase angle of the transmit signal at the frequency of the transmit signal;

determine an anti-phase of the coupled transmit signal in the second signal from the phase angle of the transmit signal and a phase calibration parameter; and
determine the phase parameter that corresponds to a phase angle difference between the anti-phase of the coupled transmit signal and the phase angle of the transmit signal.

14. The apparatus of claim 11, further comprising an antenna and a circulator, wherein the circulator is coupled to the antenna, the power amplifier, and the receive input, and wherein the circulator is configured to transmit the first signal and receive the second signal through the antenna.

15. An apparatus to reduce interference, comprising:
a transmit upconverter configured to upconvert a first signal comprising a transmit signal and a transmit noise;
a power amplifier, coupled to the transmit upconverter, configured to amplify the first signal;
a receive input configured to receive a second signal comprising a receive signal, a coupled transmit signal coupled from the transmit signal, and a coupled transmit noise coupled from the transmit noise;
a transmit feedback downconverter, coupled to the power amplifier, configured to downconvert the transmit signal;
a transmit signal echo canceller, coupled to the transmit feedback downconverter, configured to calculate a gain parameter and a phase parameter and generate a correction signal from the gain and phase parameters;
a transmit noise downconverter configured to downconvert the transmit noise;
a signal coupler, coupled to the transmit signal echo canceller and the receive input, configured to attenuate the coupled transmit signal in the second signal by combining the correction signal with the second signal;
a receive signal downconverter, coupled to the signal coupler, configured to downconvert the second signal; and
a transmit noise echo canceller, coupled to the receive signal downconverter and the transmit noise downconverter, configured to attenuate the coupled transmit noise in the second signal.

16. The apparatus of claim 15, wherein the transmit noise echo canceller is configured to:
identify a noise component of the transmit noise; and
attenuate a noise component of the coupled transmit noise corresponding to the noise component of the transmit noise.

17. The apparatus of claim 15, wherein the transmit signal echo canceller is configured to:
identify a frequency of the transmit signal;
measure a magnitude of the transmit signal at the frequency of the transmit signal;
determine a magnitude of the coupled transmit signal in the second signal from the magnitude of the transmit signal and a gain calibration parameter;
determine the gain parameter that corresponds to the magnitude of the coupled transmit signal in the second signal at the frequency of the transmit signal;
measure a phase angle of the transmit signal at the frequency of the transmit signal;
determine an anti-phase of the coupled transmit signal in the second signal from the phase angle of the transmit signal and a phase calibration parameter;
determine the phase parameter that corresponds to a phase angle difference between the anti-phase of the coupled transmit signal and the phase angle of the transmit signal;

generate an in-phase component and a quadrature component of the correction signal with the gain parameter and the phase parameter; and upconvert the correction signal with the in-phase and quadrature components of the correction signal.

18. The apparatus of claim 15, further comprising a feedback interface, coupled to the power amplifier and the receive downconverter, configured to combine the first signal with the second signal.

19. The apparatus of claim 15, further comprising a digital signal processor, wherein the digital signal processor comprises the transmit signal echo canceller and the transmit noise echo canceller.

20. The apparatus of claim 15, further comprising an antenna and a circulator, wherein the circulator is coupled to the antenna, the power amplifier, and the receive input, and wherein the circulator is configured to transmit the first signal and receive the second signal through the antenna.

* * * * *